Feb. 11, 1958  W. FRODERMANN  2,822,839
ROTARY CUTTER HEAD WITH SLOTTED CUTTER SEATS
Filed April 21, 1955
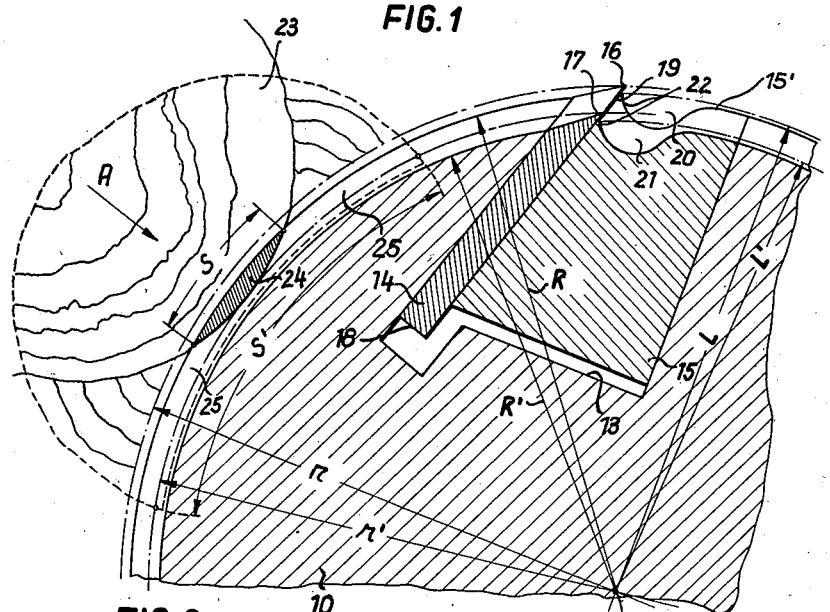
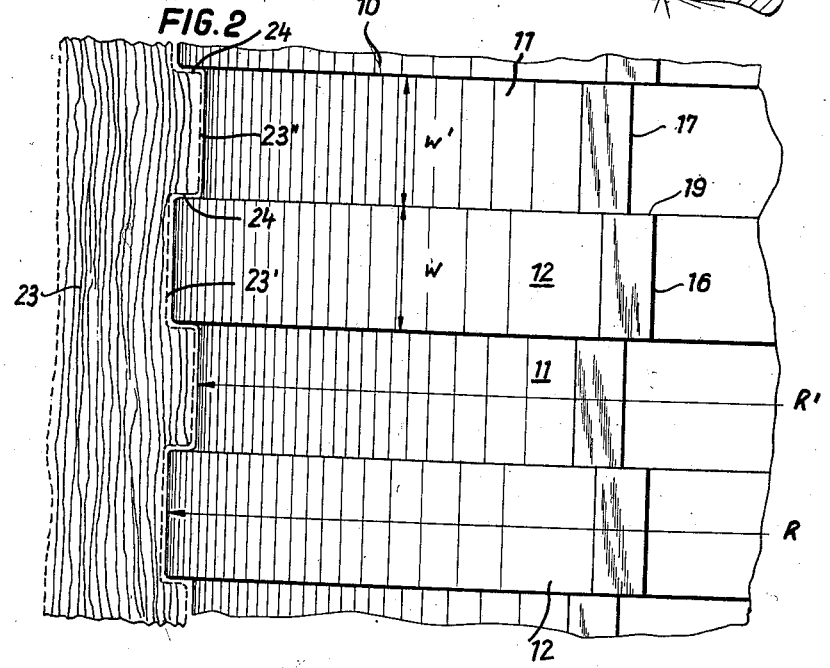
INVENTOR
WILHELM FRODERMANN

United States Patent Office 2,822,839
Patented Feb. 11, 1958

---

2,822,839

ROTARY CUTTER HEAD WITH SLOTTED CUTTER SEATS

Wilhelm Frodermann, Westphalia, Germany, assignor to F. Meyer & Schwabedissen, Herford-Westphalia, Germany, a German firm Application April 21, 1955, Serial No. 502,800

Claims priority, application Germany April 22, 1954

8 Claims. (Cl. 144—230)

This invention relates to tool assemblies or holders, and more particularly to assemblies for planing and like tools using knife-holding shafts for producing shavings, splinters, chips, and like pieces of reduced sizes of wood, plastics, plastic compositions or similar materials to be used in the manufacture of building boards and like structures.

It is an object of the present invention to provide means facilitating production of shavings, splinters, chips, and like pieces of wood, plastics, and similar solid substances in an economical and highly efficient manner and enabling the amount of waste pieces produced during the manufacture of the aforesaid building boards to be reduced to a minimum. It is another object of the present invention to provide means contributing to greatly simplified, yet extremely efficacious cutting and planing devices for producing splinters and shavings for use in the manufacture of composite wall or building boards, said devices being so constructed as to produce only flat shavings of equal lengths and uniform shape, thereby effecting substantial reductions in material wastage normally occurring in known manufacturing processes.

Another object of the present invention is to provide means affording novel and improved tool holders for use in planing shavings from a block of wood or similar material, said holders being constructed as shafts in which the cutting tools are retained and being provided with means inhibiting inadvertent displacement of said block of material during planing thereof axially of said holder.

Still another object of the present invention is to provide means permitting the use of knives and like cutting tools in a shaft-like planing tool holder in such a manner that each knife may be provided with cutting edges located alternately at different distances from the center of the shaft.

Yet another object of the present invention is to provide means ensuring formation of shavings of the desired and predetermined dimensions by a planing tool of the aforesaid type without necessitating the use of auxiliary length marking and indicating devices in conjunction with the planing tool.

It is generally known, in the art of producing shavings or splinters from wood or other plastic solid materials, to employ at least two tool holder shafts composed of milling heads, the milling heads of one shaft engaging in the gaps or interstices of the milling heads of another shaft. Squaring or determination of the dimensions of the shavings to the desired value is effected by means of small terminal cutting edges disposed in advance of the main cutting blades or knives.

Such an arrangement has the disadvantage that the source of the shavings, after passing the second shaft, must always be returned to an operative position adjacent the first shaft. A magazine feed with automatic propulsion or feeding of the wood or other material constituting such source of shavings, as well as a continuous operation, is, therefore, not possible with the aforesaid tool holder shafts, so that their efficiency or output capacity is fairly small.

Other knife holding shafts are known in which the knives are formed with interrupted cutting edges. The knives or cutting tools are so arranged on the shaft that each knife having an interrupted cutting edge is followed by a knife with a continuous or unbroken cutting edge. The function of the latter is to plane or cut off from the source that portion of the material which was left standing thereon because of the presence of the gaps in the cutting edge of the preceding knife. The cutting of the shavings to the required dimensions is effected by means of small terminal cutting edges associated with the interrupted cutting edges.

Other constructions of planing tools of the shaft type are known in which the knife-holding shafts support only knives or cutting tools having continuous or uninterrupted cutting edges, scratching or like marking devices being provided for determining the lengths or other dimensions of the shavings. These scratching or marking devices are situated either in the body of the shaft or in the clamping wedges employed to fix the knives in the shaft and, in any event, in front of the knife.

The above described constructions employing alternate interrupted and continuous knives as well as marking devices for fixing or predetermining the lengths of the shavings have the disadvantage that when the source of the shavings is entrained into movement in the direction of rotation of the cutting shaft, i. e., when a relative rolling motion of the source relative to the shaft occurs, the continuous cutting edges plane off shavings much longer than originally contemplated. To inhibit such rolling motion of the source of the shavings relative to the shaft, special devices are required which, however, usually are not reliable or sufficiently secure during the rather rough planing process.

If the marking devices are situated directly in advance of the knife edges and in the clamping wedges, then the above-mentioned disadvantage is not so apparent. However, all such cutting shafts provided with marking devices have the great disadvantage that the relatively numerous marking devices cause a considerable wastage of shavings because they tend to create saw dust over areas coordinate with their cutting widths. Such saw dust is unsuitable for the manufacture of building boards and thus represents an absolute loss or waste of raw material.

Such loss or waste becomes even more pronounced when the marking devices are not accurately positioned in the shaft, their operation then resembling an unevenly set saw. Moreover, the necessity for large numbers of such marking devices is disadvantageous from the standpoints of manufacture, insertion, aligning or straightening, attaching and sharpening of the usually extremely small blades of said marking devices.

The desired flat shavings or splinters should, for optimum building board manufacturing conditions, have a thickness of approximately 0.2–0.3 mm. During the shaving or planing process, the knives must, therefore, penetrate the wood or other material to that extent only.

Furthermore, every axial displacement of the source of shavings relative to the planing tool results in loss or waste in that the shavings or splinters are crushed, shredded, or otherwise destroyed or cut too short. The known cutting tool holder shafts and like planing tools provide no opposition or deterrent to inadvertent displacement of the material being planed axially of the shaft and thus, because of such axial displacements, afford no guarantee of possible unwasteful planing.

It is, therefore, a further prime object of the present invention to avoid the above-mentioned drawbacks and disadvantages with the ultimate view of operation of the planing tool at maximum efficiency so as to produce maximum quantities of technically superior and commercially usable shavings.

To this end, the invention contemplates a cutting tool holding shaft in the outer surface of which are provided circumferentially extending, flat-bottomed grooves or channels spaced longitudinally of the shaft and traversed and intersected by circumferentially spaced, longitudinally extending, radial recesses in which the cutting tools are clamped. The cutting edge of each of said tools is so arranged that portions thereof are alternately located at greater and lesser distances from the center of the shaft, adjacent ones of these outer and inner cutting edges being interconnected by lateral cutting edges disposed substantially transversely of said first-named cutting edge portions.

In effect, therefor, the tool-holding shaft according to the present invention has two cutting edge diameters or radii and two shaft body diameters or radii. Squaring of the shavings to the required dimensions is effected by means of the lateral, substantially radially extending cutting edges interconnecting the aforesaid outer and inner cutting edges. The lengths of the shavings are, of course, equal to the lengths of said outer and inner cutting edges.

If the source of the shavings, for example, a cylindrical block of wood, is advanced into contact with the rotating shaft, then the outer cutting edges first cut shavings from said block and thus plane grooves into the block, the widths of these grooves corresponding to the lengths of the outer cutting edges and the thickness of the shavings corresponding to the difference between the outer cutting edge diameter and the outer shaft body diameter.

In order that no frictional heating should arise at the lateral cutting edges, the channels or grooves in the tool shaft are made slightly wider than the lengths of the inner cutting edges. The projecting or raised portions remaining on the block of wood between the grooves cut thereinto by the outer cutting edges thus fit into the channels on the tool shaft and thus effect a secure interlocking of the block and the shaft to inhibit any relative axial movement between them.

Upon further operation of the tool shaft, the inner cutting edges eventually engage the aforesaid projecting portions of the block and cut shavings therefrom of a thickness depending on the difference between the inner cutting edge diameter and the inner shaft body diameter. As the planing path on the block becomes larger the guide surfaces between the block and the shaft also become larger, so that the block and shaft remain secured against relative axial displacement.

The invention will be more fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

In the drawing:

Fig. 1 is a partial sectional view of a planing tool embodying the present invention and of the material being planed; and Fig. 2 is a top view of the tool as shown in Fig. 1.

Referring now more particularly to the drawing, a tool-holding shaft, generally designated as 10, is provided in its outer surface or periphery with a plurality of circumferential grooves or channels 11 which are spaced longitudinally along the shaft. Thus, in between each pair of channels 11 there is formed a raised or projecting ledge-like portion 12, the outer surfaces of which define the outer surface of the body of shaft 10.

Provided in the body of shaft 10 is a plurality of substantially radial recesses 13 (only one of which is shown in Fig. 1) extending longitudinally of the shaft so as to intersect and interrupt channels 11 and projecting portions 12. Cutting tools 14 are positioned and clampingly retained within recesses 13 by means of suitable clamping members, such as wedges 15.

Each cutting tool or knife 14 is provided with a series of substantially parallel cutting edges 16 and 17, edge 16 being further away from base 18 of knife 14 than cutting edge 17. Thus, as may be seen in Fig. 1, when the knives or cutting tools are positioned within recesses 13, outer cutting edges 16 are located at a greater distance from the center or longitudinal axis of shaft 10 than are inner cutting edges 17. Cutting edges 16 and 17 are interconnected by means of lateral cutting edges 19 which extend substantially transversely of edges 16 and 17 and thus, in effect, extend radially of shaft 10.

Formed in the upper or outer surface 15' of each wedge 15 is an outer shaving- or splinter-receiving groove or channel 20 and an inner shaving- or splinter-receiving groove or channel 21. Grooves 20 and 21 terminate in lips or rims 22 which are located immediately adjacent but slightly below outer and inner cutting edges 16 and 17, respectively, and on the side of knife 14 facing the direction of rotation of shaft 10, i. e., the direction of planing or cutting. Thus, shavings or splinters cut from the material being planed will be temporarily retained in grooves 20 and 21 to be subsequently dispensed therefrom as said grooves are inverted due to rotation of shaft 10.

As may be seen from Fig. 1, outer cutting edge 16, when in motion, describes a circle of radius $r$ while inner cutting edge 17 describes a circle of radius $r'$. The body of shaft 10 has an outer radius R and an inner radius R', the inner radius being the distance from the center of the shaft to the bottom of channels 11. Lips 22, when in motion, describe, respectively, inner and outer circles of radii L and L'.

As may be seen from Fig. 2, the width $w'$ of each groove 11 is substantially equal to the length of the corresponding inner cutting edge 17, while the width $w$ of each raised portion 12 is substantially equal to the length of the corresponding outer cutting edge 16. Thus, each cutting edge 17 is in registry with a groove 11 and each cutting edge 16 is in registry with a raised portion 12. However, in practice, it is preferred that the lengths of cutting edges 17 be slightly less than width $w'$ of channels 11 in order to avoid a frictional heating of shaft 10 and possible combustion of the shavings due to friction between the latter and the walls of channels 11.

In operation, the material from which the shavings are to be planed, for example, a cylindrical block of wood 23, is advanced toward shaft 10 in the direction of arrow A. As shaft 10 rotates under the action of any suitable drive means (not shown), outer knife edges 16 come in contact with said block of wood first and cut shavings therefrom. The thickness of these shavings corresponds to the difference between $r$ and R which are, respectively, the radius of the circle of motion of blade 16 and the distance from the center of the shaft to the outer surface of portion 12 of the shaft.

Due to the fact that there are gaps between the various cutting edges 16 of each knife 14, there will be formed on block 23 a series of grooves 23' separated by and alternating with a series of raised portions 23'', each of the latter providing pairs of axial guide surfaces 24. Raised portions 23'' register with and fit into channels 11 of shaft 10 and thus prevent relative axial displacement between shaft 10 and block 23 due to the engagement between surfaces 24 and the side walls of channels 11.

This process continues until block 23 has been planed off to the extent of a planing path or area S. At such time, raised portions 23" of block 23 extend sufficiently into channels 11 to permit inner cutting edges 17 to begin to cut shavings from said raised portions. These shavings have thicknesses depending on the difference between r' and R' which are, respectively, the radius of the circle of movement of cutting edges 17 and the distance from the center of shaft 10 to the bottom of channels 11. According to the preferred embodiment of the invention, the shavings produced by edges 16 are of the same thickness as the shavings produced by edges 17.

Block 23 will, consequently, be planed off to a continually increasing extent, for example, until the planing path or area corresponds to S'. At this point, guide surfaces 24 of raised portions 23" of block 23 will have increased in length, as shown at 25 in Fig. 1. Thus, even though more and more material is planed or cut from block 23 and transported away therefrom in grooves 20 and 21, there will always be present in the surface of block 23 a series of channels or grooves 23' alternating with a series of raised portions 23" registering, respectively, with projecting portions 12 and channels 11 of shaft 10. This ensures that no relative axial displacement between shaft 10 and block 23 can ever take place, no matter how much material has been cut from block 23.

As will be readily realized, block 23 need not necessarily be composed of wood. The principle of the invention is equally applicable to plastics or plastic compositions and to other solids which are susceptible or lend themselves easily to planing. Moreover, cutting tools 14 may be retained within recesses 13 by any suitable locking or clamping means other than wedges 15, as shown.

Although, in the preferred construction of the invention, shaft 10 is provided with alternating channels and raised portions, the result contemplated by the invention, i. e., prevention of relative axial displacement between shaft 10 and block 23 could be attained by simply providing cutting edges 16 and 17 disposed alternately at different distances from the center of the shaft without forming corresponding channels in the shaft.

The interconnecting sides of the knives between the cutting edges, e. g., 19, would, in such a construction, serve to prevent such axial displacement. However, it must be noted that in such an eventuality the shavings cut by the outer cutting edge would be much thicker than the shavings cut by the inner cutting edge, which would tend to reduce the availability and suitability of all the shavings produced for the manufacture of the building boards.

Thus, it may be seen that there has been provided, in accordance with the invention, a device for planing shavings of uniform sizes and shapes from wood and similar planable materials, comprising a shaft of circular cross-section provided in its outer surface with a plurality of circumferentially extending channels spaced longitudinally of said shaft and having flat bottoms disposed substantially parallel to the longitudinal axis of said shaft, said shaft being provided with a plurality of circumferentially spaced, radial, longitudinally extending recesses interrupting said channels at equal intervals and transversely thereof, a plurality of cutting tools supported by and longitudinally of said shaft within said recesses, respectively, each of said cutting tools being provided with cutting edges alternately disposed at different distances from said axis of said shaft and projecting, respectively, beyond said outer surface of said shaft and beyond said bottoms of said channels, each of said cutting tools being further provided with lateral cutting edges extending substantially transversely of said first-named cutting edges and interconnecting respective adjacent ones of said first-named cutting edges, and locking means disposed within each of said recesses and operable to clampingly retain said cutting tools within their respective recesses and with all of their cutting edges in predetermined position relative to said outer surface of said shaft.

Having thus described the invention, what is claimed as new and desired to be secured by Letters Patent is:

1. A device for cutting splinters, shavings, and like pieces from wood and similar materials; comprising a shaft of circular cross-section provided with a plurality of circumferentially extending channels having flat bottoms disposed substantially parallel to the longitudinal axis of said shaft, said shaft being provided with a plurality of circumferentially spaced, radial recesses interrupting said channels at regular intervals and extending substantially transversely to said channels, a cutting tool supported by said shaft within each of said recesses, each of said cutting tools being provided with alternate outer and inner cutting edges arranged to project, respectively, beyond the outer surface of said shaft and beyond said bottoms of said channels, said tools being further provided with lateral cutting edges extending substantially transversely to said inner and outer cutting edges and interconnecting respective adjacent inner and outer cutting edges, and wedge means disposed within each of said recesses and operable to clampingly retain said tools within their respective recesses and with all of their cutting edges in predetermined position relative to said outer shaft surface.

2. A device for planing shavings of uniform sizes and shapes from wood and similar planable materials; comprising a shaft provided in its outer surface with a plurality of peripherally extending channels spaced from one another longitudinally of said shaft, said shaft being provided with a plurality of peripherally spaced, longitudinally extending recesses interrupting said channels at predetermined intervals, a cutting tool supported by and longitudinally of said shaft within each of said recesses, each of said cutting tools being provided with cutting edges alternately disposed at different distances from the longitudinal axis of said shaft and projecting, respectively, beyond said outer surface of said shaft and beyond the bottoms of said channels, each of said cutting tools being further provided with lateral cutting edges extending substantially transversely to said first-named cutting edges and interconnecting respective adjacent ones of said first-named cutting edges, and locking means disposed within each of said recesses and operable to clampingly retain said cutting tools within their respective recesses and with all of their cutting edges in predetermined position relative to said outer surface of said shaft.

3. A device according to claim 2, said locking means comprising wedge members inserted, respectively, in said recesses, each wedge member being wedgingly interposed between a respective one of said cutting tools and a wall of the associated recess.

4. A device according to claim 3, each of said wedge members having an upper surface disposed adjacent said outer surface of said shaft, each of said upper surfaces being provided with an outer shaving-receiving groove and an inner shaving-receiving groove located, respectively, adjacent the outer and inner cutting edges of the corresponding cutting tool.

5. A device according to claim 2, the widths of said channels being slightly greater than the lengths of the corresponding inner cutting edges of said cutting tools.

6. A holder for at least one cutting tool which cutting tool has a base portion and cutting edge portions alternately spaced a relatively larger and smaller distance from said base portion; comprising a shaft circular in cross-section and provided with a plurality of circumferentially extending channels, said channels being spaced from each other by projecting portions provided on said shaft, said shaft being provided with at least one substantially radial recess extending longitudinally of said shaft and intersecting said channels in transverse direction thereof and constructed to receive said cutting tool with the cutting edge portions which are spaced a larger distance from the base of the cutting tool in registry with said projections and with the cutting edge portions which are spaced a smaller distance from the base of the cutting tool in registry with said channels, and means disposed within said recess for clamping said cutting tool in position therein.

7. A holder according to claim 6, said channels having flat bottom walls disposed substantially parallel to the longitudinal axis of said shaft.

8. A holder for at least one cutting tool which cutting tool has a base portion and cutting edge portions alternately spaced greater and lesser distances from said base portion; comprising a shaft provided with a plurality of peripheral grooves, said grooves being spaced from one another longitudinally of said shaft by projecting portions provided on said shaft, said shaft being further provided with at least one inwardly and substantially longitudinally extending recess intersecting said grooves and said projecting portions and constructed to receive said cutting tool with the cutting edge portions which are spaced a larger distance from the base of the cutting tool in registry with said projections and with the cutting edge portions which are spaced a smaller distance from the base of the cutting tool in registry with said grooves and clamping means engageable with said cutting tool and with said shaft for fixing said cutting tool in position in said recess.

References Cited in the file of this patent

UNITED STATES PATENTS

| | | |
|---|---|---|
| 341,149 | Knowlton | May 4, 1886 |
| 553,280 | Dupes | Jan. 21, 1896 |
| 604,813 | Ward | May 31, 1898 |
| 1,519,876 | Phelps | Dec. 16, 1924 |
| 1,780,846 | Shimer et al. | Nov. 4, 1930 |